United States Patent

[11] 3,609,192

[72] Inventors Werner Hoffman;
Heinrich Pasedach, both of Ludwigshafen, Germany
[21] Appl. No. 811,598
[22] Filed Mar. 28, 1969
[45] Patented Sept. 28, 1971
[73] Assignee Badische Anilin- & Soda-Fabrik Aktiengesellschaft
Ludwigshafen am Rhine, Germany
[32] Priority Mar. 30, 1968
[33] Germany
[31] P 17 68 099.8

[54] PRODUCTION OF ALK-1-EN-5-ONES AND ALK-1-EN-5-ALS
3 Claims, No Drawings
[52] U.S. Cl. ..................................... 260/590,
260/586, 260/601, 260/594, 260/595, 260/473,
260/345.9, 260/347.8, 260/531, 260/333, 260/483
[51] Int. Cl. ....................................... C07c 49/76,
C07c 49/20, C07c 49/24
[50] Field of Search .......................... 260/590,
586, 333, 345.9, 601, 347.8; 11/595, 594

[56] References Cited
OTHER REFERENCES
Isoshima, Chemical Abstracts 51, 3656 (1957)
Allenmark et al., Chemical Abstracts 69, 105840b (1968)

*Primary Examiner*—Daniel D. Horwitz
*Attorney*—Johnston, Root, O'Keeffe, Keil, Thompson & Shurtleff ABSTRACT: Production of alk-1-en-5-ones and alk-1-en-5-als having the general formula (I):

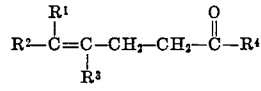

(I)

in which $R^1$, $R^2$ and $R^3$ each denotes a hydrogen atom or a hydrocarbon radical having from one to 40 carbon atoms which may be joined together in pairs to form five-membered to seven-membered rings and which may contain oxygen atoms as heteroatoms and in which $R^4$ denotes a hydrogen atom or a hydrocarbon radical having one to 40 carbon atoms which may also contain oxygen atoms as heteroatoms. Said compounds I being formed by reacting an allyl alcohol having the formula (II):

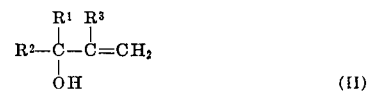

(II)

at a temperature of from 50° to 350° C. with an acyl malonate having the formula (III):

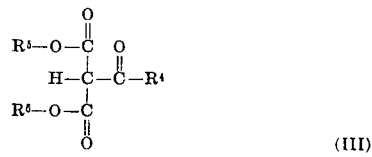

(III)

in which the radicals $R^5$ and $R^6$ denote identical or different alkyl groups having from 1 to 8 carbon atoms, and the resultant intermediate product having the general formula (IV):

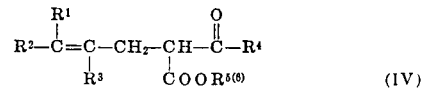

(IV)

is hydrolyzed and decarboxylated.

PRODUCTION OF ALK-1-EN-5-ONES AND ALK-1-EN-5-ALS

The present invention relates to a new process for the production of alk-1-en-5-ones and alk-1-en-5-als having the general formula (I):

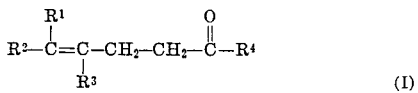

(I)

in which $R^1$, $R^2$ and $R^3$ each denotes a hydrogen atom or a hydrocarbon radical having from one to 40 carbon atoms or in which these radicals may be joined together in pairs to form five-membered to seven-membered rings which may contain oxygen atoms as heteroatoms, and in which $R^4$ denotes a hydrogen atom or a hydrocarbon radical having from one to 40 carbon atoms which may also contain oxygen atoms as heteroatoms.

Individual representatives of the class of compounds defined by the formula (I) are known but are obtainable only by special methods which are not generally applicable and usually in inadequate yields.

The object of the present invention is therefore to make compounds having the formula (I) accessible by a method which is simple and universally applicable.

We have found that the said compounds are obtained in a remarkable reaction when an allyl alcohol having the general formula (II):

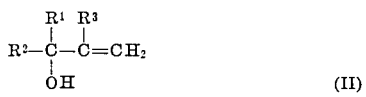

(II)

is reacted at a temperature of from 50° to 350° C. with an acyl malonate having the general formula (III):

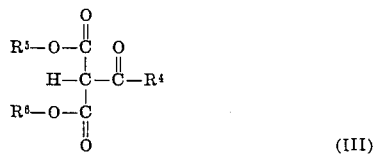

(III)

in which the radicals $R^5$ and $R^6$ denote identical or different alkyl groups having from one to eight carbon atoms, and the resultant intermediate product having the general formula (IV):

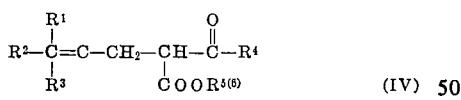

(IV)

is subjected to ketone cleavage immediately or after having been isolated.

The hydrocarbon radicals $R^1$, $R^2$ and $R^3$ may be branched or linear, saturated or unsaturated aliphatic radicals, cycloaliphatic or aromatic radicals or radicals combined from the said radicals. These radicals, as defined above, may contain oxygen as a heteroatom, namely as a hydroxyl group or carboxyl group in ether, ketone, ester or epoxide groupings.

Examples of allyl alcohols (II) suitable as starting materials are allyl alcohol itself, but-1-en-3-ol, 4-ethyloct-1-en-3-ol, 1-vinylcyclohexan-1-ol, linalool, nerolidol, isophytol, 3-phenylprop-1-en-3-ol and 3-methylpent-1-en-3-ol.

Starting compounds (II) in which $R^1$ denotes a methyl group, $R^3$ denotes a hydrogen atom and $R^2$ denotes a group having the general formula:

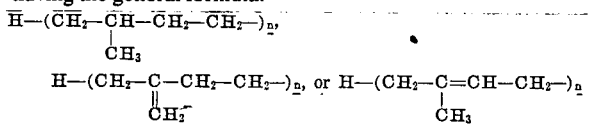

in which n denotes one of the integers from 1 to 8 have particular significance for syntheses in the fields of vitamins and perfumes.

The acyl malonates (III) are obtainable in a simple way by reaction for example of sodium malonate or magnesium malonate with an acid chloride $R^4$-CO-CL (V). Examples of suitable radicals $R^4$ in the compounds (III) or (V) include the formyl, acetyl, propionyl, isobutyryl, benzoyl, β-hydroxypropionyl and β-methoxyacryloyl groups.

Compounds (II) and (III) react with each other in stoichiometric amounts but it is often advisable in order to achieve the highest possible conversion to use the cheaper component in an excess of up to about five times the stoichiometric amount.

The reaction is preferably carried out at a temperature of from 50° to 350° C., particularly from 110° to 190° C., in the presence or absence of solvents or diluents and at a pressure of from 100 mm. Hg. to 10 atmospheres but as a rule at atmospheric pressure.

Liquids which are inert in the present reaction are suitable as solvents or diluents and, among these, particularly high boiling point hydrocarbons, such as perhydronaphthalene and tetrahydronaphthalene, dimethylformamide and N-methylpyrrolidone.

Since not only the alcohol $R^5OH$ or $R^6OH$, but also carbon dioxide is eliminated in the reaction of (II) with (III), the end of the reaction can easily be ascertained.

The intermediate product (IV) obtainable direct from (II) and (III) may be isolated from the reaction mixture by a conventional method, for example by distillation, or may also preferably be subjected without isolation to ketone cleavage.

For ketone cleavage, the product (IV) or the reaction mixture containing the product (IV) is allowed to react for from about 5 minutes to 2 hours at from 50° to 100° C. with from 1 to 5 moles percent (with reference to the amount of (IV)) of an acid, such as sulfuric acid, hydrochloric acid, phosphoric acid or acetic acid at a pH value of from about 1 to 3, after which the product (I) of the process is isolated by a conventional method. Two-stage ketone cleavage in which the —$COOR^5$ or —$COOR^6$ group of (IV) is subjected to alkaline hydrolysis and then the actual cleavage is carried out in acid medium is often preferred.

A large number of alk-1-en-5-ones (γ, δ-unsaturated ketones) and alk-1-en-5-als (γ,δ-unsaturated aldehydes) are accessible in a simple and universally applicable method by the process according to this invention, which can be carried out with special advantage continuously conventional methods. The products themselves have excellent perfume properties; they can also be used as valuable starting materials for a number of organic syntheses.

The invention is illustrated by the following examples in which percentages are by weight.

EXAMPLE 1

Phenyl-(4-methylhex-3-en-1-yl)ketone:

110 g. (1.1 moles) of 3-methylpent-1-en-3-ol is gradually added at from 175° to 180° C. to 264 g. (1 mole) of diethyl benzoylmalonate, the ethanol formed being continuously removed from the reaction mixture. About 3 hours later, when carbon dioxide is not longer being eliminated, 500 ml. of 20 percent caustic soda solution is added to the reaction mixture together with 100 ml. of ethanol to produce a homogeneous solution, the whole is heated for 2 hours at 80° C. and then acidified at 40° c. with 10N sulfuric acid to a pH value of 1.

After the elimination of carbon dioxide has ended, the product is isolated as usual by extraction and distillation.

The ketone specified above is obtained in a yield of 74 percent; boiling point from 94° to 95° C. at 0.005 mm. Hg.; $n_D^{25}$ =1.5226.

EXAMPLE 2

2,7,11-trimethyldodeca-6,10-dien-3-one:

This ketone is obtained in a yield of 77 percent (boiling point from 83° to 85° C. at 0.01 mm. Hg.; $n_D^{25}$=1.4640) from 230 g. of diethyl isobutyroylmalonate (1 mole) and 169 g. of linalool (1.1 moles) in the manner described in example 1.

EXAMPLE 3

7-methylnon-6-en-3-one:

This ketone (boiling point from 91° to 93° C. at 10 mm. Hg.; $n_D^{25}$=1.4440) is obtained in a yield of 71 percent from 216 g. (1 mole) of diethyl propionylmalonate and 110 g. (1.1 moles) of 3-methyl-pent-1-en-3-ol in the manner described in example 1.

EXAMPLE 4

6,10-dimethylundeca-5,9-dien-2-one (geranylacetone):

Geranylacetone (boiling point 112° to 119° C. at 0.05 mm. Hg.; $n_D^{25}$=1.4670) is obtained in a yield of 74 percent from 202 g. (1 mole) of diethyl acetylmalonate and 169 g. (1.1 moles) of linalool by the method described in example 1.

EXAMPLE 5

6-cyclohexylidenehexan-3-one:

108 g. (0.5 mole) of diethyl propionylmalonate is allowed to react for about 1 hour at from 150° to 180° c. with 69 g. (0.55 mole) of 1-vinylcyclohexan-1-ol and then 300 ml. of 20% caustic soda solution and 100 ml. of methanol are added to the mixture which is heated at 80° C. for another hour. It is then acidified to a pH value of 1 with 30% sulfuric acid at 60° C. and worked up into the desired product. The above-mentioned ketone is obtained in a yield of 72 percent (boiling point from 66° to 68° C. at 0.06 mm. Hg.; $n_D^{25}$=1.4777).

EXAMPLE 6

7-ethylundeca-5-en-2-one:

This ketone is obtained in a yield of 76 percent (boiling point from 60° to 62° C. at 0.1 mm. Hg.; $n_D^{25}$=1.4431) from 110 g. (0.5 mole) of diethyl acetyl-malonate and 78 g. (0.55 mole) of 4-ethyloct-1-en-3-ol by the method described in example 5.

EXAMPLE 7

6,10-dimethyl-10-methoxyundeca-5-en-2-one:

186 g. (1 mole) of 3,7-dimethyl-7-methoxyoct-1-en-3-ol and 303 g. (1.5 moles) of diethyl acetylmalonate are heated while stirring. The reaction temperature is raised during the course of the reaction from 120° to 175° C. After about 1 hour, the elimination of alcohol and carbon dioxide is over and the reaction mixture is then fractionally distilled.

In addition to a small amount of starting material, 225 g. of 6,10-dimethyl-10-methoxy-3-carbethoxyundeca-5-en-2-one (boiling point from 133° to 136° C. at 0.5 mm. Hg.; $n_D^{25}$=1.4582) is obtained.

For ketone cleavage, this product is added to a solution of 80 g. of sodium hydroxide in 500 ml. of water, alcohol is added until the product has completely dissolved and the whole is heated for 1 hour at from 70° to 80° C. It is then acidified to a pH value of 1 with 40% sulfuric acid at from 40° to 50° C. and worked up in the usual way. The product of the process is obtained by distillation in a yield of 75 percent (boiling point from 85° to 88° C. at 0.1 mm. Hg.; $n_D^{25}$=1.4553).

EXAMPLE 8 6,10-dimethyl-10-hydroxyundeca-5-en-2-one:

The desired product (boiling point from 115° to 117° C. at 0.08 mm. Hg.; $n_D^{25}$=1.4660) is obtained in a yield of 72 percent from 172 g. (1 mole) of 3,7-dimethyloct-1-en-3,7-diol and 242 g. (about 1.2 moles) of diethyl acetylmalonate in the manner described in example 7.

EXAMPLE 9

7,11-dimethyldodeca-6,10-dien-3-one-1-carboxylic acid:

152 g. (1 mole) of linalool and 356 g. (1.3 moles) of 1,1-dicarbethoxy-4-carbomethoxybutan-2-one are reacted in the course of about 45 minutes at 160° to 200° C. After the elimination of alcohol and carbon dioxide has ended, the reaction mixture is subjected to ketone cleavage as described in example 7 and worked up in the usual way. The product is obtained in a yield of 64 percent (boiling point from 152° to 155° C. at 0.03 mm. Hg.; melting point 35° C.).

EXAMPLE 10

5,9-dimethyldeca-4,8-dien-1-al: 77 g. (0.5 mole) of linalool and 113 g. (0.6 mole) of diethyl formylmalonate are reacted at from 120° to 165° C. in the course of about 60 minutes. When the elimination of alcohol and carbon dioxide has ended, the reaction mixture is distilled. In addition to starting material, 90 g. of 5,9-dimethyl-2-carbethoxydeca-4,8-dien-1al (boiling point from 122° to 115° C. at 0.5 mm. Hg.; $n_D^{25}$=1.4746) is obtained.

In ketone cleavage of this product in the usual way, 5,9-dimethyldeca-4,8-dien-1-al is obtained in a yield of 40 percent (boiling point from 92° to 96° C. at 0.9 mm. Hg.; $n_D^{25}$=1.4997).

We claim:

1. A process for the production of alk-1-en-5-ones or alk-1-en-5-als having the formula:

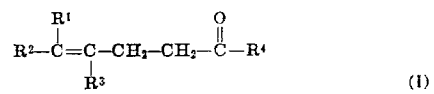
(I)

in which R¹, R² and R³ each denotes a hydrogen atom or a hydrocarbon radical having from one to 40 carbon atoms and any pair of which may combine to form a five-membered to seven-membered ring which may contain an oxygen atom as a heteroatom, in which R⁴ denotes a hydrogen atom or a hydrocarbon radical having from one to 40 carbon atoms which may also contain an oxygen atom as a heteroatom, wherein an allyl alcohol having the formula:

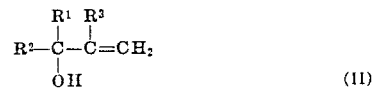
(II)

is reacted at a temperature of from 50° to 350° C. with an ester of an acylmalonic acid having the formula:

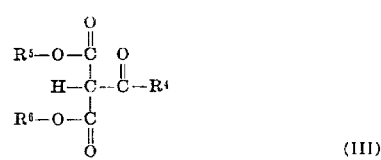
(III)

in which the radicals R⁵ and R⁶ may be identical or different and each denotes an alkyl group having from one to 8 carbon atoms to form an intermediate product having the formula:

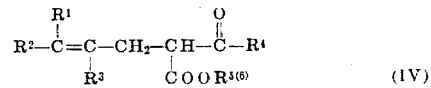
(IV)

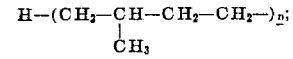

said intermediate product subsequently being treated with an acid or an alkali and then an acid to form said compound (I) by ketone cleavage.

2. A process as claimed in claim 1 wherein the allyl alcohol starting material used is one in which R¹ denotes a methyl group, R³ denotes a hydrogen atom and R² denotes one of the groups having the formula:

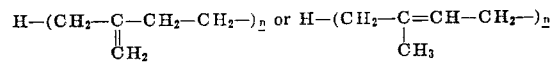

in which n denotes one of the integers from 1 to 8.

3. A process as claimed in claim 1 carried out at from 110° to 190° C.

PO-1050
(5/69)

UNITED STATES PATENT OFFICE
CERTIFICATE OF CORRECTION

Patent No. 3,609,192  Dated September 28, 1971

Inventor(s) Werner Hoffmann and Heinrich Pasedach

It is certified that error appears in the above-identified patent and that said Letters Patent are hereby corrected as shown below:

Column 1, line 77, "CL" should read -- Cl --.

Column 2, line 29, "moles" should read -- mole --; line 55, "not" should read -- no --.

Column 4, lines 57 to 59, Claim 1, delete "$H-(CH_2-CH-CH_2-CH_2-)\underline{n}$";
$$\hspace{3cm} | \\ \hspace{3cm} CH_3$$

line 68, Claim 2, insert -- $H-(CH_2-CH-CH_2-CH_2-)\underline{n}$ --.
$$\hspace{3cm} | \\ \hspace{3cm} CH_3$$

Signed and sealed this 25th day of April 1972.

(SEAL)
Attest:

EDWARD M. FLETCHER, JR.  ROBERT GOTTSCHALK
Attesting Officer  Commissioner of Patents